Sept. 27, 1960  W. H. HERAEUS ET AL  2,954,496
CASINGS FOR GAS DISCHARGE TUBES AND LAMPS
Filed July 13, 1953

Inventors:
Wilhelm Heinrich Heraeus
Heinrich Mohn
by Klein & Hart
Attorneys

United States Patent Office 2,954,496
Patented Sept. 27, 1960

2,954,496
CASINGS FOR GAS DISCHARGE TUBES AND LAMPS

Wilhelm Heinrich Heraeus, Newark, N.J., and Heinrich Mohn, Hailer, Kreis Gelnhausen, Germany, assignors to Heraeus Quarzschmelze G.m.b.H., Hanau (Main), Germany Filed July 13, 1953, Ser. No. 367,687

Claims priority, application Germany July 15, 1952

3 Claims. (Cl. 313—221)

This invention relates to quartz lamps used both for therapeutic and visible lighting or illumination purposes.

The object of the invention is to produce quartz lamps of high emission of energy or light, both ultra-violet and illuminating, and maintaining such emissions for a long time at high efficiency.

Quartz lamps have been widely used for therapeutic purposes and lately have come into extensive use in street lighting systems. Such quartz lamps, in all manner of use, lose a substantial part of their efficiency by reason of the substantial deterioration of the quartz glass casing or envelope.

Ultra-violet therapeutic lamps, made of quartz glass, rated at 100% efficiency when first used, lose substantially 40% of their ultra-violet ray emission efficiency after about 1500 hours of use although the lamp as an ultra-violet ray producing instrument still has many hundreds of additional hours of useful operation. The same substantial loss of visible light emission occurs with quartz lamps used for illumination purposes although there again the lamp as a light producing instrument has many hundreds of additional hours of useful operation. Such loss of efficiency commences almost initially with the operation of the lamps and is evident from examination after 100 hours of use and after about 1500 hours of use such efficiency has dropped about 40% from its initial efficiency.

Such loss in street illumination is highly uneconomical as such lamps generally have a service span of well over 3000 hours. In ultra-violet therapeutic lamp uses, the deterioration is not only costly but leaves the user without exact information how long the lamp is to be used as a therapeutical appliance.

We have found that in the manufacture of such quartz lamps, considerable amounts of gas and foreign matter are occluded in the quartz casing or envelope in irregular contoured formations, many in the form of "hair lines." These formations progressively cause deterioration of the light and ultra-violet ray emission through the quartz casing or envelope which ultimately results in great loss of efficiency as heretofore explained.

In order to explain this invention in detail it is illustrated in connection with quartz glass made by the hydrogen gas method.

It has been determined by this invention that the loss of efficiency is due to the occluded gas in the manufacture of the quartz glass from which the lamps are made. The occluded gas forms "hair lines," bubbles, fissures and other irregularly shaped formations, which in turn after use of the lamps affect the character of the quartz glass and results in the loss of efficiency as referred to. The theory is advanced, without any intention of advancing it as the fact, that the occluded gas in the hair lines, bubbles, fissures or other formations, react upon the glass or a constituent thereof, causing areas thereof to become opaque or otherwise affected so as to cause such areas to be low in efficiency or to lose their efficiency for the transmission or emission of light or ultra-violet rays.

This invention involves making the quartz glass so as to eliminate hair lines, bubbles, fissures and other like formations and restrict the occluded gas or other impurities to minute cells of no greater size than 0.5 mm. and as small as 0.1 mm. in their longest dimension and distribute such cells over extended areas in the lamp walls.

Inasmuch as the occluded gas cannot be, economically, entirely eliminated, we have found that if such gas is confined to small cells no greater than 0.5 mm. in their longest dimension when the quartz glass is made and by distributing such small cells over extended areas in the lamp casing or envelope when drawn so that the average cells per 10 cm. of casing or envelope area do not exceed 5 in number, and preferably limited to 3 cells, the light and ray emission efficiency of the lamps are greatly increased.

Lamps made according to this invention when initially used lose about 8 to 10% of their light emission efficiency very slowly and reach the maximum loss of efficiency of 8 to 10% in about 1500 hours of use. The lamps after such loss of 8 to 10% become stabilized and constant in their efficiency and will thereafter operate at approximately such high rate for the remainder of the life of the lamp.

The worker experienced in making quartz glass can readily determine when the desired size of the cells has been obtained and their proper relative positions, or whether further working of the glass is desired to attain such sizes and relations.

Gas discharge tubes having quartz casings and envelopes are employed for the generation of ultra-violet rays and of visible light. To utilize such tubes for generating ultra-violet rays has attained great importance for therapeutic as well as for technical purposes. Mercury discharge tubes have proved to be especially suitable. Other metal-vapor discharge tubes, for instance, of cadmium, are of minor importance. In order to attain highest light-emission, it has been suggested to fill the discharge tube with highly volatile compounds, for instance, with chlorides of metals which are only difficultly volatile. Said chlorides dissociate in the discharge tube so that the characteristic spectrum of the metals is emitted.

In the case of mercury discharge lamps a distinction is made between low pressure discharge lamps and high pressure discharge lamps, the border line between both types being at a pressure of about 10 to 100 torrs. Discharge lamps at pressures of more than about 30 atmospheres are designated as highest pressure discharge lamps. The present invention relates more particularly to the improvement of gas discharge tubes for high pressure discharge and, at the same time, for highest pressure discharge.

The attached drawings illustrate two embodiments of gas discharge tubes provided with a quartz casing or envelope in accordance with the present invention.

Figure 1:
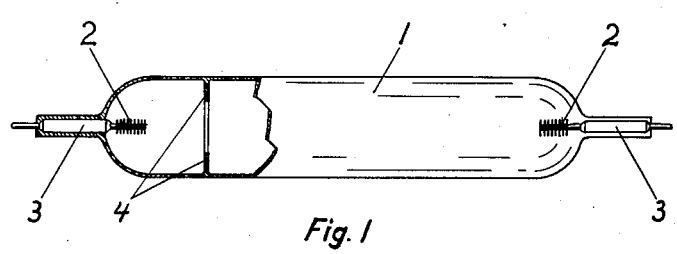
Fig. 1 shows a burner for producing ultra-violet rays, which serves for the generation of ultra-violet rays in therapeutic lamps.

The discharge chambers, the so-called "burners," in high pressure lamps and highest pressure lamps ordinarily consist of quartz glass. In most cases the casing of the burner is a tubular body, usually of elongated shape or bent in U-form. Of course, devices of this type of spherical shape or provided with spherical extensions are also known. Capillary tubes are also used especially when high energy concentration of the gas discharge is required. The casings or envelopes of such burners are made of quartz glass tubes, which were drawn, for instance (see U.S. Patents No. 1,291,921 to Keyes and No. 2,027,155 to Devers), from a blank that was fused by a gas or electric process.

The casings of the gas discharge devices, for instance tubes, and the tubing of which they are made, in accordance with the present invention, do not contain elongated bubbles and gas occlusions like burners now known, i.e., they do not contain bubbles extending lengthwise over many millimetres and having an apparent surface area of substantially more than 0.5 mm.$^2$ As stated above, according to the invention, only very few small cells which are just recognizable with the naked eye, are present in said quartz tubes, namely small cells of an apparent surface area of less than 0.5 mm.$^2$, preferably less than 0.2 mm.$^2$, especially less than 0.1 mm.$^2$, and small cells, the greatest length of which is not more than 0.5 mm. The following rule regarding the number of such small cells in a gas discharge may be given: Tubes serving for making of burners shall contain not more than 5 such small cells and preferably not more than 3 cells that are just visible to the naked eye, per each 10 cm. of length. To produce the quartz glass of this invention and to avoid the formation of fissures, bubbles, hair lines, and like defects, and to produce the small number of minute cells hereinbefore referred to, in said tubes, preferably, a process of manufacture may be employed which consists in fusing high-grade rock crystal or the like quartz material in the presence of gases which prevent any deeper penetration of foreign elements, such as metals, alkali metals, alkaline earth metals, and especially of carbon, iron, copper, into the fused quartz. Such gases are hydrogen, helium and other rare gases, and especially the halogens chlorine, bromine and iodine. Heating and fusing rock crystals in the presence of such gases avoids the occlusion and retention, in the quartz, of elements which favor recrystallization thereof, and eliminates impurities which cause devitrification and/or solarization. Thereby, a fused quartz glass of high purity and freedom of said objectionable elements is obtained. The degree of elimination of said elements is readily demonstrated by the appearance of the fused glass which shows that considerably fewer cells of markedly smaller size are present therein than in quartz glass as produced heretofore. After said fusion in the presence of said gases, the quartz glass is handled and worked up in a vacuum at a high temperature.

The process, by means of which quartz glass is formed from silicon tetrachloride in an oxyhydrogen gas flame, can also be utilized so that a product having the small size cells referred to hereinbefore is obtained.

The new burners of gas discharge tubes according to the present invention have the additional advantage that their service life is considerably increased. Aging which gradually diminishes the permeability for ultra-violet rays and visible light is considerably delayed so that a considerably higher yield of visible light or ultra-violet radiation, respectively, is maintained over a longer period of time. Furthermore, it has been found that burners according to this invention turn out more uniformly during manufacture than heretofore possible. Consequently, waste on large scale manufacture is reduced. Likewise, the working conditions during heating and evacuating the tubes are simplified.

An example of a burner useful for the production of ultra-violet rays, especially in therapeutic lamps, which, however, may be used for many technical purposes, is illustrated in Fig. 1. It represents a mercury high pressure lamp, the quantity of mercury of which is regulated in such a way that it completely vaporizes during operation. Electrodes 2, supplied with electric current by means of current inlets 3, are arranged in quartz glass casing 1 according to this invention. Screen 4 prevents impurities from passing from the electrodes into the gas chamber. According to the teaching of this invention, casing 1 consists of quartz glass which shows, at the most, only very few small cells which are just visible to the naked eye, for instance, only 2 small bubbles of a length of less than 0.5 mm. over the entire length of the burner. As already mentioned, the improvement achieved by this invention is of considerable importance for ultra-violet radiators not only for therapeutic use but also for various technical purposes, for instance, in connection with various physical apparatus, laboratory devices, and as source for ultra-violet rays for chemical reactions. The improvement according to this invention is especially useful in connection with high pressure lamps in devices for making blueprints because such devices require as uniform emission as possible over the entire length of the burner.

Figure 2:
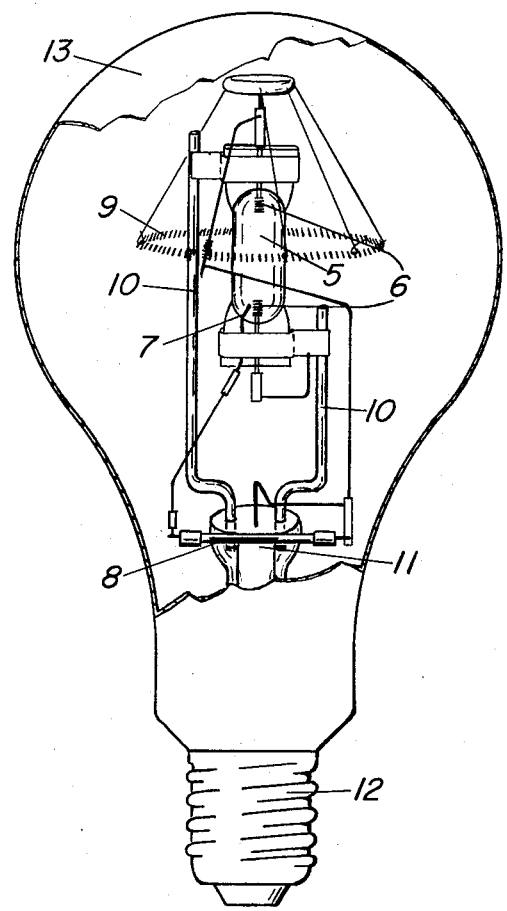
Fig. 2 shows a mercury vapor mixed light lamp, i.e., a lamp for lighting or illuminating purposes in which, besides the gas discharge radiator, a coiled filament is arranged.

In Fig. 2 a lamp for illuminating purposes is illustrated which contains a gas discharge lamp according to the present invention. Said lamp is a mercury vapor-mixed light lamp, i.e., a lamp combining a mercury vapor discharge tube with a coiled up filament lamp, both serving at the same time as a source of light. Burner casing 5 is made of quartz glass which is almost void of bubbles according to the present invention. Two electrodes 6 and auxiliary electrode 7 provided to insure perfect ignition, and ignition resistance 8 are arranged in said lamp. Coiled up filament 9 fulfills a double task. It serves as a further source of light and, at the same time, as a series resistance for the gas discharge tube. Parts supplying the electric current are conductor 10, which also serves as a support, pinch foot 11 for vacuum tight introduction of the electric wire, and screw cap 12 for screwing in the bulb. All the parts mentioned are sealed in glass bulb 13. In electric lamps for illuminating purposes frequently the gas discharge tube is not surrounded by a coiled up filament and the series resistance is arranged outside of the lamp body. In this case, for instance, the series resistance may be a simple ohmic resistance, or an inductive resistor, or a filament lamp. All these illuminating lamps according to the present invention have a guaranteed considerably increased service life.

The present invention has also proved of great advantage in high pressure and highest pressure mercury discharge tubes, in which the burners have the form of a tube of small cross-section or a spherical or capillary form. These tubes for intensive illumination made of quartz glass are subject to considerable thermal stress at their inner walls due to their high energy density. The voltage drop per cm., for instance, is of the magnitude of several hundred volts, at a current intensity of the magnitude of several or only a few amperes. Thereby, a surface luminous intensity of the tied up gas discharge is produced which is of the magnitude of tens of thousands of international candles per sq. cm. The temperature in such tubes rises to 700° C. to 1200° C. (1292° F. to 2192° F.). By using quartz glass which is almost void of bubbles, fissures, hair lines, and other defects, as material comprising the casing of radiators according to the present invention, such high efficiency radiators of high energy density can be operated for such a long period of time that it becomes possible to make the widest possible use thereof.

The above described devices are, of course, merely examples of embodiments of this invention and serve to demonstrate the advance in the art achieved thereby. The invention, of course, is by no means limited thereto and may find various other applications.

We claim:

1. A high pressure mercury vapor discharge lamp, comprising an envelope of high grade quartz glass, said envelope being deprived of occluded gases visible to the naked eye, excepting minute cells thereof having an apparent surface of less than 0.5 sq. mm., said cells being distributed apart in the envelope with an average number of cells per 10 cm. of envelope length not exceeding substantially 5 cells, and spaced electrodes sealed in said envelope.

2. A high pressure mercury vapor discharge lamp, in accordance with claim 1, in which said cells have an apparent surface of less than 0.2 sq. mm.

3. A high pressure mercury vapor discharge lamp, in accordance with claim 2, in which the length of said cells is less than substantially 0.1 mm.

References Cited in the file of this patent

UNITED STATES PATENTS

| | | |
|---|---|---|
| 1,291,921 | Keyes | Jan. 21, 1919 |
| 1,537,036 | Miller | May 5, 1925 |
| 1,549,597 | Miller | Aug. 11, 1925 |
| 1,581,829 | Berry | Apr. 20, 1926 |
| 1,852,864 | Sullivan | Apr. 5, 1932 |
| 1,869,163 | Niedergesass | July 26, 1932 |
| 2,027,155 | Devers | Jan. 7, 1936 |
| 2,038,627 | Badger | Apr. 28, 1936 |